US005234197A

United States Patent [19]

Wurdack

[11] Patent Number: 5,234,197

[45] Date of Patent: Aug. 10, 1993

[54] DEVICE FOR LIFTING AND SUSPENDING OBJECTS

[75] Inventor: Kirk Wurdack, Landing, N.J.

[73] Assignee: Renovisions, Inc., Edgemont, Pa.

[21] Appl. No.: 899,340

[22] Filed: Jun. 16, 1992

[51] Int. Cl.[5] .............................................. F16M 13/00

[52] U.S. Cl. .............................................. 254/94

[58] Field of Search .................. 254/94, 422; 414/678, 414/778

[56] References Cited

U.S. PATENT DOCUMENTS

| | | | |
|---|---|---|---|
| 569,056 | 10/1896 | Regan . | |
| 640,120 | 12/1899 | Floyd . | |
| 843,292 | 2/1907 | McIntosh . | |
| 1,343,275 | 6/1920 | Mulvihill . | |
| 1,635,291 | 7/1927 | Smith et al. . | |
| 2,725,946 | 12/1955 | Welter . | |
| 3,674,252 | 7/1972 | Crabtree et al. | 254/94 |
| 4,744,717 | 5/1988 | Dyer | 254/94 |
| 5,039,070 | 8/1991 | Warner | 254/94 |

*Primary Examiner*—Robert C. Watson

*Attorney, Agent, or Firm*—Ratner & Prestia

[57] ABSTRACT

A device is provided for lifting objects and holding those objects suspended. The device comprises an arcuate foot, one end of which is adapted to fit under an object to be lifted, and a central shaft secured to the foot at a predetermined angle. The shaft is secured intermediate the ends of the foot. The device also includes a brace adapted to be positioned against a vertical surface of the object to be lifted, and means connected to the shaft and the brace for holding the brace at a distance from the shaft. The angle between the shaft and the foot is adjustable and generally forms an "L" or "T" shape. The brace consists of an elongated trough with a U-shaped cross section having a hole bored through the central portion of the brace. At the hole are secured two arms, an upper and a lower arm. The lower arm is fixed to the portion of the shaft near the attachment to the foot, while the other arm is slidably mounted on the upper portion of the shaft. These two arms act as scissors and in this way the distance from the brace to the shaft is adjustable.

17 Claims, 6 Drawing Sheets

DEVICE FOR LIFTING AND SUSPENDING OBJECTS

BACKGROUND OF THE INVENTION

The present invention pertains to a device for raising objects off a surface and suspending those objects. The reasons for raising objects, such as furniture and the like, off a surface, such as a floor, are numerous. Automobile jacks are commonly used for raising automobiles, and crow bars and lever bars and the like are also available for raising other objects. Hand trucks and forklifts for lifting pallets of materials are also available. However, the problems with these lifting devices are several, the automobile jacks and similar devices are not particularly suitable to raising objects such as desks, or tables and the like, due to their bulkiness and inablility to interact effectively with the furniture. Lever bars and crow bars are much more suited to lifting furniture, however once the lever bar is slipped under the furniture to be lifted, and pressure applied in order to lift the furniture, pressure must be continuously applied to the lever bar, or the furniture will be lowered back to its initial position.

The present invention overcomes these difficulties by providing a device by which furniture or other objects may be lifted and held suspended without further pressure by the operator of the device.

SUMMARY OF THE INVENTION

The present invention pertains to a device for lifting objects and holding those objects suspended, which comprises an arcuate foot, one end of which is adapted to fit under an object to be lifted, and a central shaft secured to the foot at a predetermined angle. The shaft is secured intermediate the ends of the foot. The device also includes a brace adapted to be positioned against a vertical surface of the object to be lifted, and means connected to the shaft and the brace for holding the brace at a distance from the shaft. The angle between the shaft and the foot is adjustable. The brace consists of an elongated trough with a U-shaped cross section having a hole bored through the central portion of the brace. At the hole are secured two arms, an upper and a lower arm. The lower arm is fixed to the portion of the shaft near the attachment to the foot, while the other arm is slidably mounted on the upper portion of the shaft. These two arms act as scissors and in this way the distance from the brace to the shaft is adjustable.

In operation, the foot is placed underneath the object to be lifted and the brace is placed against the side of the object to be lifted. An operator pulls back on the shaft and thus uses the shaft and foot as a lever to lift the object. The brace is adjusted so that it is flush against the side of the object, and the brace is locked in place. Thereafter pressure may be released from the shaft and the object will remain suspended.

DETAILED DESCRIPTION OF THE INVENTION

Figure 1:
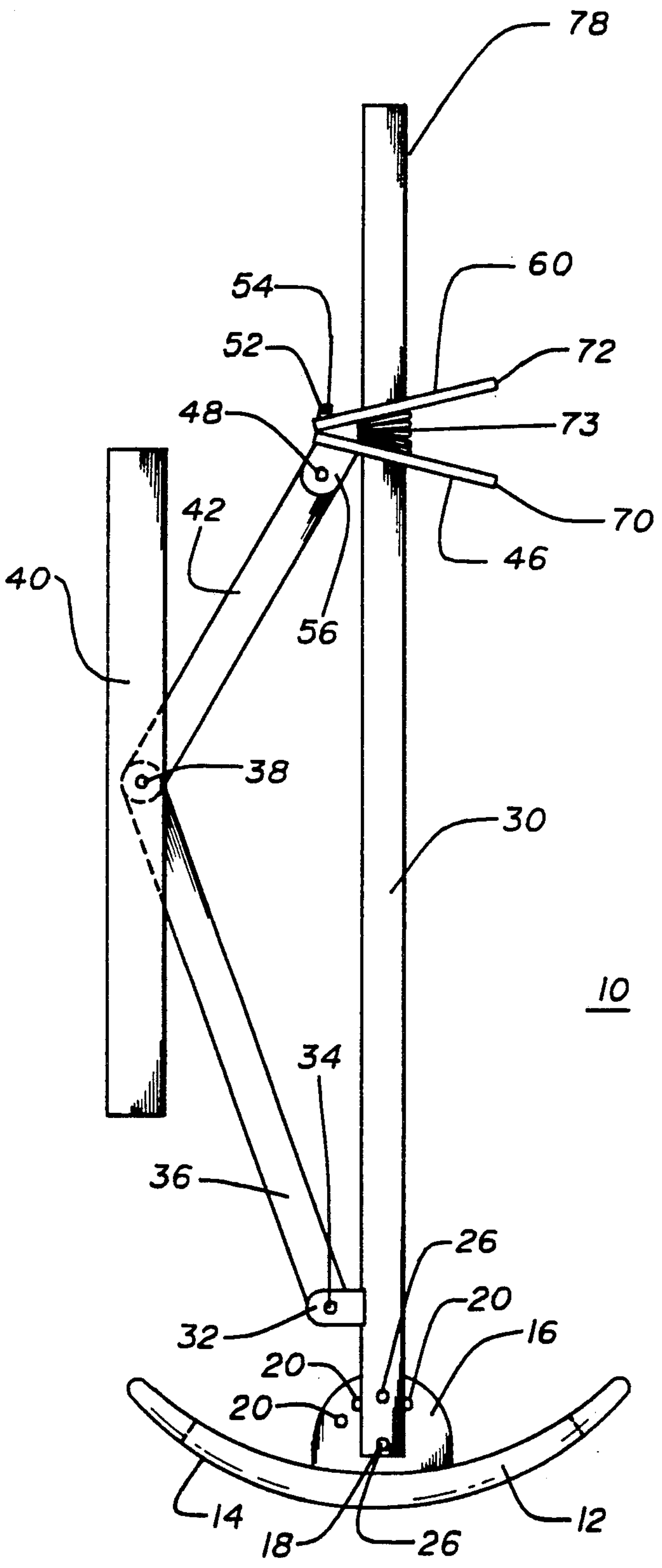
FIG. 1 is a side view of the device of the present invention.
Figure 10:
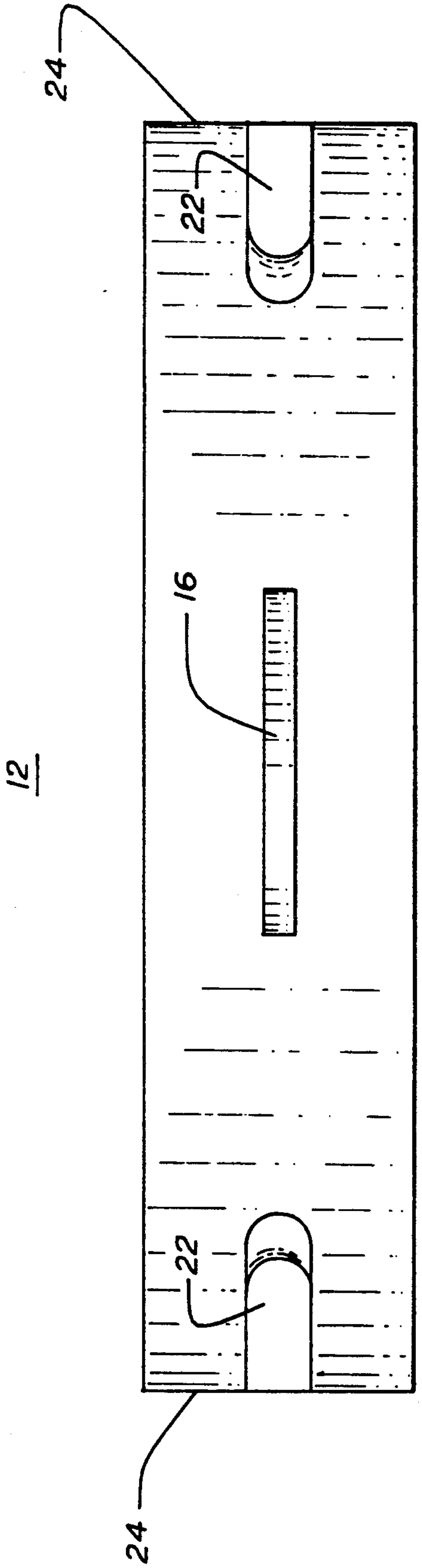
FIG. 10 is a plan view of the foot of the device of the present invention.

Referring now to FIG. 1, the device 10 of the present invention comprises foot 12 which has an arcuate configuration. The bottom surface 14 of foot 12 is generally smooth but may be fitted with a skid resistant finish, such as cross hatching, rubber, or some other skid resistant surface. The opposite side of foot 12 is fitted with a mounting plate 16. The mounting plate has a central hole 18 bored therethrough, and a plurality of holes 20 bored around the outer portion of the mounting plate. Foot 12 can also be seen in FIG. 10. Foot 12 can be equipped with cutout portions 22 which are adapted to fit around the leg of a table or other object. Mounting plate 16 is generally located intermediate ends 24 of foot 12.

Attached to mounting plate 16 by bolt 26 is shaft 30. Shaft 30 may have any of several predetermined positions with respect to foot 12 as dictated by holes 18 and 20 in mounting plate 16. Nevertheless, shaft 30 in conjunction with foot 12 generally forms an "L" shape or "T" shape, although perhaps a slant "L" or "T". To the lower end of shaft 30 near mounting plate 16 is mounting bracket 32. Attached to mounting bracket 32 by bolt 34 is lower arm 36. Lower arm 36 is attached in such a way that it pivots freely with respect to mounting bracket 32. The other end of lower arm 36 is attached by bolt 38 to brace 40. Bolt 38 allows pivotal movement of brace 40 with respect to arm 36. Bolt 38 also attaches upper arm 42 to brace 40 and allows pivotal movement of upper arms 42 with respect to brace 40.

Figure 4:
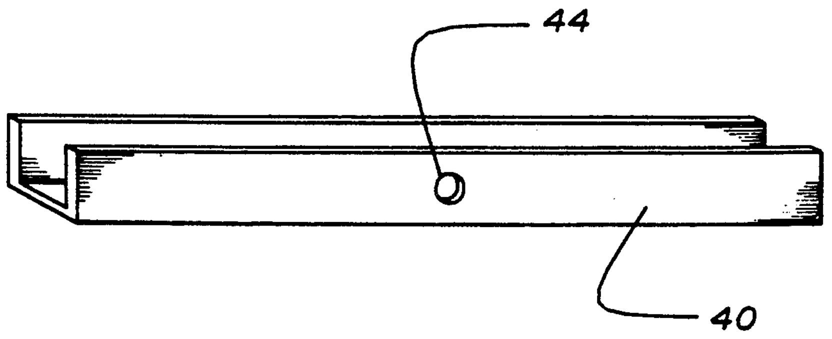
FIG. 4 is a three-dimensional view of the brace of the device of the present invention.
Figure 7:
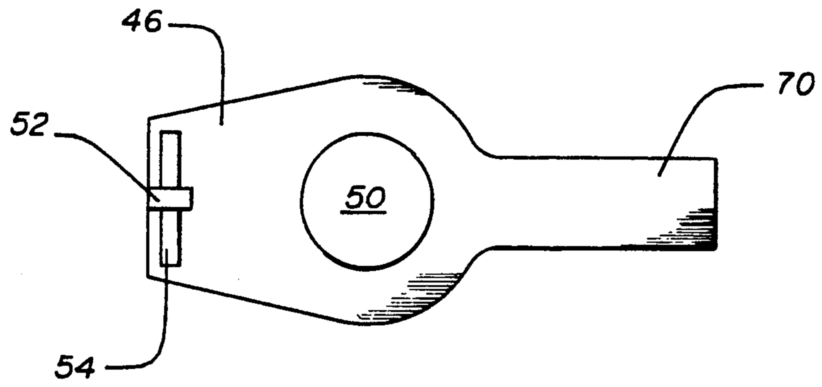
FIG. 7 is a top plan view of the mounting ring of the device of the present invention.
Figure 8:
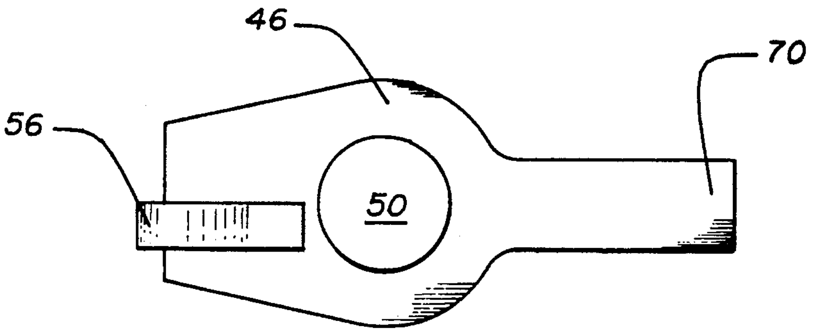
FIG. 8 is a bottom plan view of the mounting ring of the device of the present invention.
Figure 9:
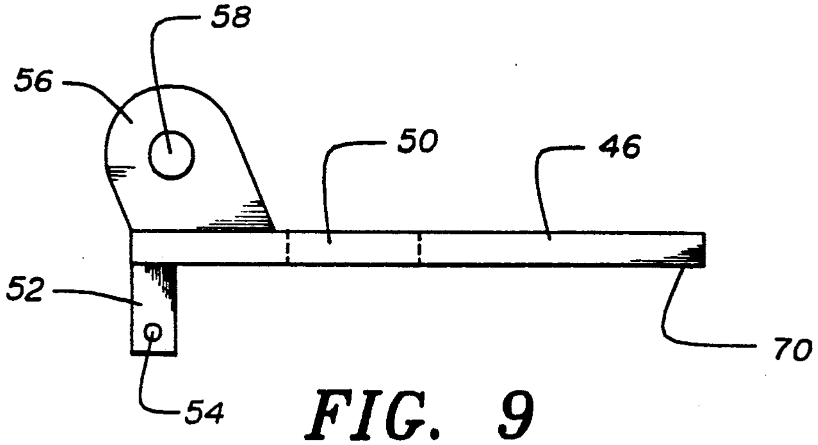
FIG. 9 is a side view of the mounting ring of the device of the present invention.

Brace 40 may be more clearly seen from FIG. 4. Brace 40 is elongated with a U-shaped cross section, as may be seen from FIG. 4. Hole 44 protrudes through both arms of brace 40 to allow arms 36 and 42 to be secured to brace 40. The free end of upper arm 42 is secured to mounting ring 46 by bolt 48. Mounting ring 46 may be more closely seen from FIGS. 7-9. FIG. 7 shows mounting ring 46 with a hole 50 therethrough. Hole 50 is just slightly larger in interior diameter than the outside diameter of shaft 30. The difference in diameters is generally a few hundred-thousandths of an inch. Mounting ring 46 includes a post 52 on the upper portion thereof, having a shaft 54 projecting through post 52. Mounting ring 46 also includes, attached to the underside thereof, mounting plate 56 having hole 58 therethrough. Bolt 48 projects through hole 58 to secure upper arm 42 to mounting plate 56, while allowing upper arm 42 to pivot with respect to mounting plate 56.

Figure 5:
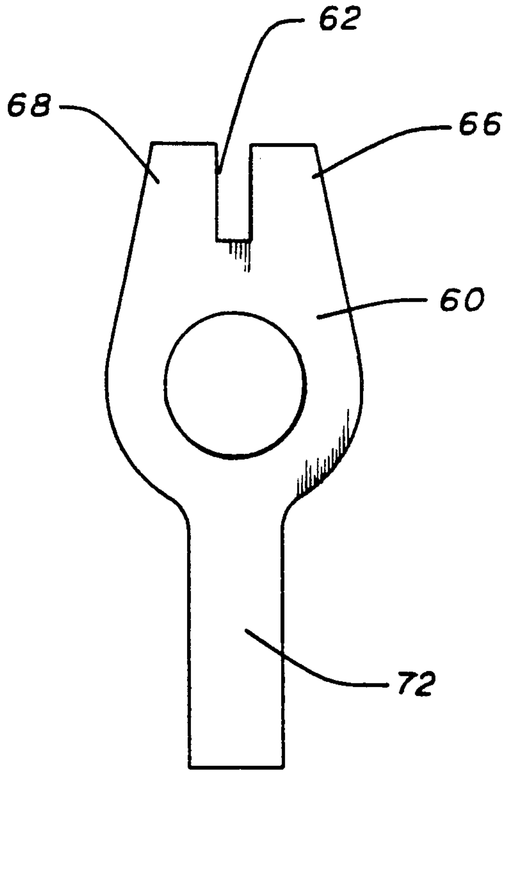
FIG. 5 is a plan view of the locking ring of the device of the present invention.
Figure 6:
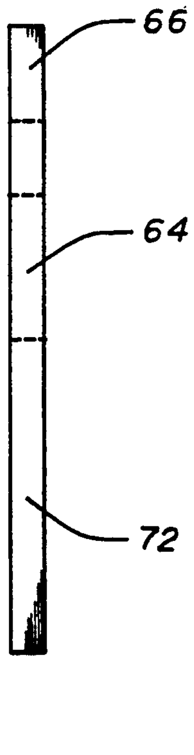
FIG. 6 is a side view of the locking ring of the device of the present invention.

Locking ring 60, which may be more easily seen from FIG. 5, includes slot 62 which receives post 52 projecting from mounting ring 46. Locking ring 60 also includes hole 64 which is just slightly larger than shaft 30 and surrounds shaft 30, as may be seen from FIG. 1.

Locking ring 60 also includes two end portions thereof, 66 and 68, which are held beneath shaft 54 on post 52. Mounting ring 46 and locking ring 60 each include a handle portion, 70 and 72, respectively. Between mounting ring 46 and locking ring 60, and around shaft 30 is spring 73. Spring 73 is used to bias mounting ring 46 and locking ring 60 apart, as shown in FIG. 1.

When handle portions 70 and 72 mounting ring 46 and locking ring 60 are moved apart, as they are shown in FIG. 1, the two rings lock against shaft 30, preventing movement of mounting ring 46 and locking ring 60 with respect to shaft 30. Spring 73 maintains the two rings in this position without pressure from the operator of the device. When the two handle portions 70 and 72 are moved together, locking ring 60 and mounting ring 46 may slide freely up and down shaft 30. When mounting ring 46 moves up and down shaft 30, lower arm 36 and upper arm 42 act as scissors, moving brace 40 closer and farther from shaft 30. Mounting ring 46 and locking ring 60 may move continuously up and down shaft 30 and lock at any point thereon, making brace 40 continuously variably distant from shaft 30. Thus, brace 40 may be locked in place at any distance from shaft 30, limited by the length of upper and lower arms 42 and 36, respectively.

Figure 2:
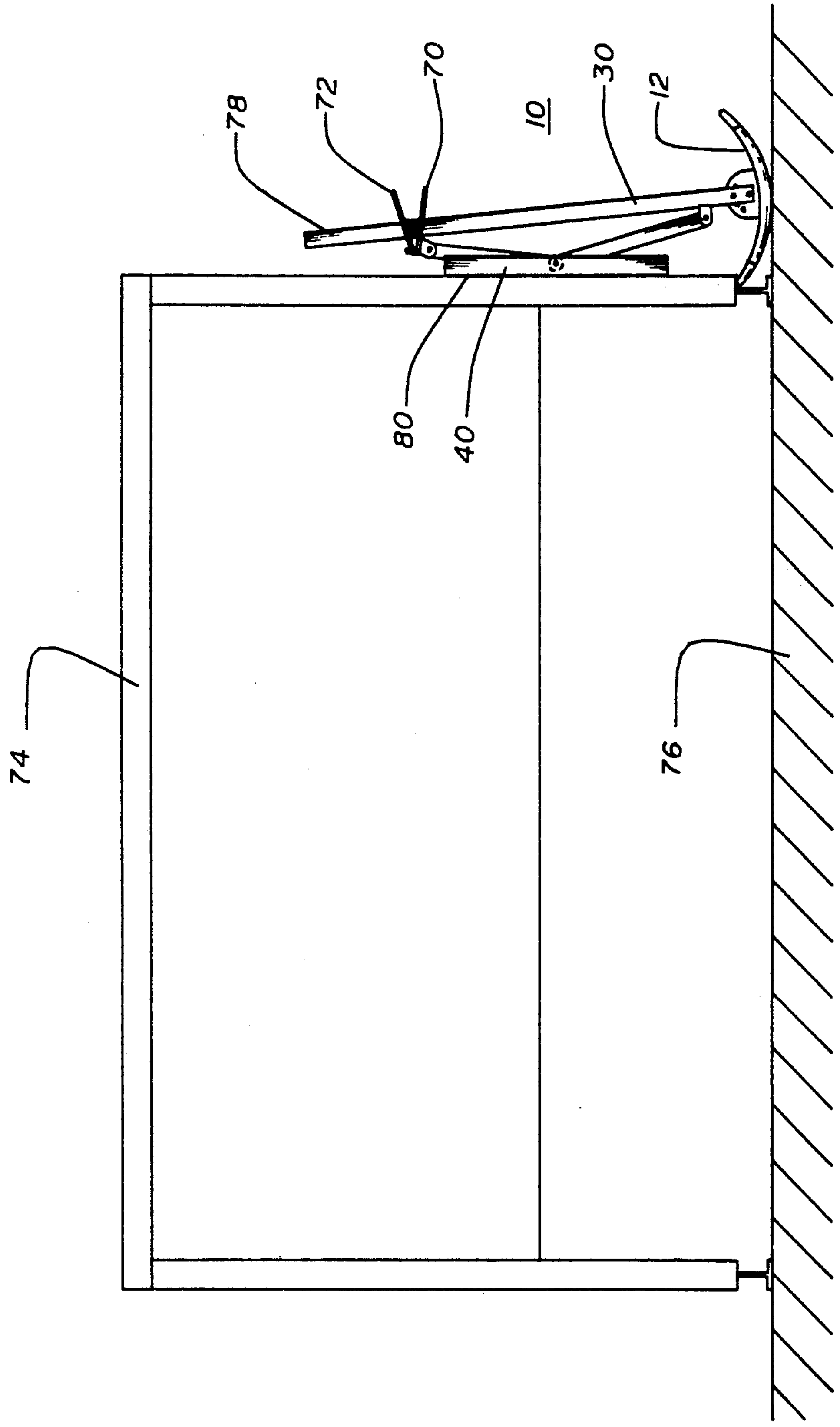
FIG. 2 is a side view of the device of the present invention positioned to lift a desk.
Figure 3:
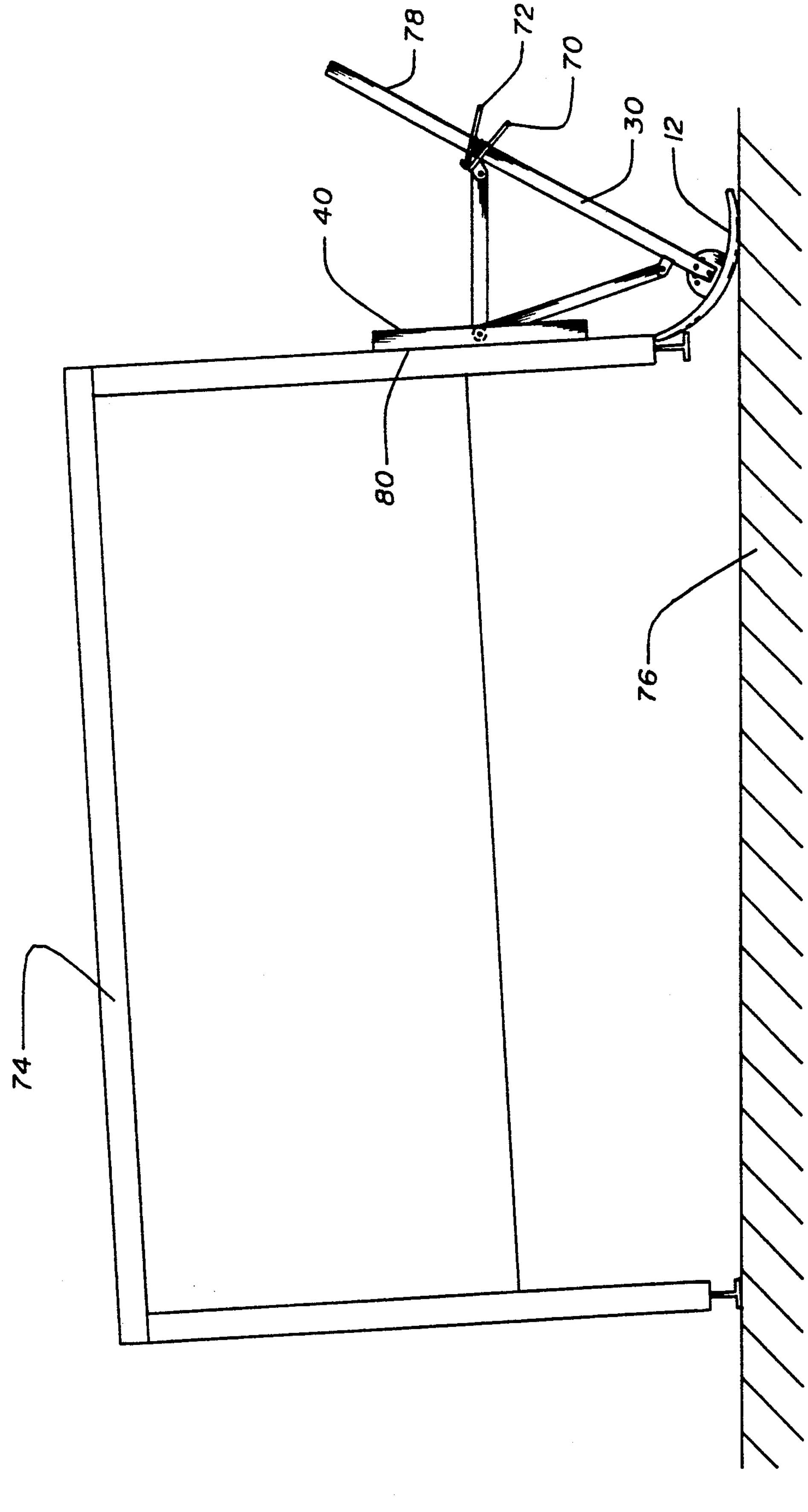
FIG. 3 is a side view of the device of the present invention holding a desk suspended.

The operation of the present invention may be most clearly seen from FIGS. 2 and 3. FIG. 2 shows an object such as a desk 74 resting on a floor or other surface 76. The foot 12 of device 10 is slipped underneath desk 74. Brace 40 is placed against the side portion of desk 74 or other object to be lifted. Handle portion 78 of shaft 30, which may optionally be equipped with knurled grooves or other grip-aiding device, is pulled away from the object to be lifted, namely desk 74. Foot 12 rolls backward, and handle portions 70 and 72 are brought together and slid downward on shaft 30, to a position shown in FIG. 3, forcing bracket 40 away from shaft 30, and maintaining brace 40 in contact with the side 80 of object 74. Handle portions 70 and 72 are then released, spread apart by spring 73, and locked against shaft 30, which locks brace 40 against side 80 of object 74, at a distance from shaft 30.

Pressure may then be released from handle portion 78, and the object will remain suspended in the position shown in FIG. 3.

In order to lower the object, handle portion 78 is grasped and handle portions 70 and 72 of mounting ring 46 and locking ring 60 are squeezed together and thus freed to slide up and down shaft 30. The locking ring 60 is slid up shaft 30 retracting brace 40, and handle portion 78 is moved toward object 74 until the position shown in FIG. 2 is once again achieved. Device 10 may then be removed by removing foot 12 from under object 74. In this way, a multiplicity of objects may be lifted and held suspended with a minimum of effort.

Other varying configurations of device 10 may be easily contemplated. The particular shape of foot 12 is only important insofar as it provides a correct shape for lifting object 74 and foot 12 and shaft 30 thus generally form an "L" or "T" shape. Foot 12 may also include a roller or wheel on its end opposite brace 40, such that when an object is lifted, foot 12 is set back on its wheel, allowing the device and object to be moved on its wheel. Furthermore, replacing locking ring 60 and mounting ring 46, may be some other continuously variable or incrementally variable sliding adjustment, such as a series of holes drilled through shaft 30 at periodic distances and a cotter pin which may be placed through the holes to prevent movement of mounting ring 46 or some other member slidably mounted on shaft 30. Furthermore, the continuous adjustment of distance from brace 40 to shaft 30 may be provided by a single arm projecting directly from shaft 30, having a variable length (whether continuously or incrementally variable), and an end attached to brace 40, or adapted to contact a vertical surface of an object without a separate brace.

It is understood that various other modifications will be apparent to one skilled in the art without departing from the spirit and scope of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A device for lifting an object and holding said object suspended comprising:

- an arcuate foot, one end of which is adapted to fit under an object to be lifted;
- a central shaft secured at a predetermined angle to said foot;
- a brace comprising an elongated member having a hole therethrough, said brace adapted to be positioned against a vertical surface of said object to be lifted; and
- means connected to said shaft and to said brace at said hole for holding said brace at a distance from said shaft, whereby said brace pivots about said hole.

2. The device of claim 1 wherein said holding means comprises;

- a lower arm having a first end pivotally secured to said shaft and a second end pivotally secured to said brace at said hole; and
- an upper arm having a first end pivotally and selectively slidably secured to said shaft and a second end pivotally secured to said brace at said hole.

3. The device of claim 1 wherein said central shaft is secured to said foot intermediate the ends thereof.

4. A device for lifting and maintaining an object suspended comprising:

- means for supporting said object from the underside thereof;
- handle means extending upwards from and connected to said support means, for levering to lift said object;
- a lower arm having a first end secured to said handle means and a second end secured to a brace; and
- an upper arm having a first end pivotally and selectively slidably secured to said handle means and a second end secured to said brace.

5. The device of claim 4 wherein said variable bracing means is continuously variable.

6. The device of claim 5 wherein said handle means is connected to said support means intermediate the ends thereof.

7. A device for lifting an object and holding said object suspended comprising:

- an arcuate foot, one end of which is adapted to fit under an object to be lifted;
- a central shaft secured at a predetermined angle to said foot;
- a brace adapted to be positioned against a vertical surface of said object to be lifted;

a lower arm having a first end secured to said shaft and a second end secured to said brace; and an upper arm having a first end pivotally and selectively slidably secured to said shaft and a second end secured to said brace.

8. The device of claim 2 wherein said central shaft is secured to said foot intermediate the ends thereof.

9. The device of claim 7 wherein said central shaft is secured to said foot intermediate the ends thereof.

10. The device of claim 1 wherein said foot includes means for securing said shaft at a plurality of predetermined angles thereto.

11. The device of claim 2 wherein said foot includes means for securing said shaft at a plurality of predetermined angles thereto.

12. The device of claim 7 wherein said foot includes means for securing said shaft at a plurality of predetermined angles thereto.

13. The device of claim 1 wherein said foot includes a slot therethrough at said one end thereof.

14. The device of claim 2 wherein said foot includes a slot therethrough at said one end thereof.

15. The device of claim 7 wherein said foot includes a slot therethrough at said one end thereof.

16. The device of claim 3 wherein said foot includes means for securing said shaft at a plurality of predetermined angles thereto.

17. The device of claim 16 wherein said foot includes a slot therethrough at said one end thereof.

* * * * *